US007583675B2

(12) United States Patent
Lee

(10) Patent No.: US 7,583,675 B2
(45) Date of Patent: Sep. 1, 2009

(54) APPARATUS AND METHOD FOR VOICE MULTIPLEXING IN AN ASYNCHRONOUS TRANSFER MODE NETWORK SUPPORTING VOICE AND DATA SERVICE

(75) Inventor: Sung-Won Lee, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 955 days.

(21) Appl. No.: 10/306,547

(22) Filed: Nov. 27, 2002

(65) Prior Publication Data

US 2003/0099240 A1 May 29, 2003

(30) Foreign Application Priority Data

Nov. 28, 2001 (KR) .................... 10-2001-0074705

(51) Int. Cl.
*H04L 12/28* (2006.01)
*H04J 3/14* (2006.01)
*G08C 15/00* (2006.01)
*G06F 11/00* (2006.01)
*G01R 31/08* (2006.01)

(52) U.S. Cl. .................... 370/395; 370/235; 370/413; 370/465; 709/226

(58) Field of Classification Search ......... 370/229–242, 370/351–395, 252–254, 474, 401, 413–431, 370/527–529; 709/226–238, 241
See application file for complete search history.

(56) References Cited

U.S. PATENT DOCUMENTS

| 5,875,192 | A | * | 2/1999 | Cam et al. ............... 370/395.7 |
| 6,002,670 | A | * | 12/1999 | Rahman et al. ............. 370/238 |
| 6,128,280 | A | * | 10/2000 | Jamoussi et al. ............ 370/230 |
| 6,222,858 | B1 | * | 4/2001 | Counterman ................ 370/474 |
| 6,563,791 | B1 | * | 5/2003 | Nakagawa ................. 370/235 |
| 6,574,224 | B1 | * | 6/2003 | Brueckheimer et al. .. 370/395.6 |
| 6,603,767 | B1 | * | 8/2003 | Murakami et al. ....... 370/395.64 |
| 6,658,008 | B1 | * | 12/2003 | Hosein .................. 370/395.64 |
| 6,717,948 | B1 | * | 4/2004 | Subbiah ................. 370/395.64 |
| 6,717,955 | B1 | * | 4/2004 | Holler ....................... 370/474 |
| 6,760,335 | B1 | * | 7/2004 | Andersson et al. ....... 370/395.2 |
| 6,765,910 | B1 | * | 7/2004 | Johnson ..................... 370/394 |
| 6,781,993 | B1 | * | 8/2004 | Takechi et al. ........... 370/395.1 |
| 6,798,783 | B1 | * | 9/2004 | Rangarajan et al. ......... 370/412 |
| 6,822,960 | B1 | * | 11/2004 | Manchester et al. ......... 370/394 |
| 6,963,538 | B1 | * | 11/2005 | Giroux et al. ............ 370/236.1 |
| 6,985,503 | B1 | * | 1/2006 | DeGrandpre et al. ........ 370/536 |

(Continued)

*Primary Examiner*—M. Phan
(74) *Attorney, Agent, or Firm*—The Ferrell Law Firm, LLP

(57) ABSTRACT

An apparatus and method for multiplexing voice packets to an ATM cell in an ATM network. Voice packets received from voice users to which voice calls have been connected are stored in a queue. An output rate controller determines a maximum number of ATM cells that can be transmitted during a predetermined control period according to information about the voice calls. When a voice packet is received at the queue, or when a predetermined operation period is reached, the output rate controller compares a number of ATM cells transmitted during the control period with the maximum number of ATM cells. If the number of transmitted ATM cells is less than the maximum number of ATM cells, the output rate controller requests a multiplexer to output an ATM cell. Then the multiplexer forms an ATM cell from stored voice packets by multiplexing.

14 Claims, 15 Drawing Sheets

U.S. PATENT DOCUMENTS 7,065,093 B1 * 6/2006 Kumar et al. ............... 370/401
7,068,657 B2 * 6/2006 Keller-Tuberg ............. 370/394
7,068,665 B2 * 6/2006 Lee .......................... 370/395.6
7,333,426 B1 * 2/2008 Hill et al. .................... 370/219
7,349,408 B2 * 3/2008 Rangarajan et al. .... 370/395.51

* cited by examiner

| VOCODER TYPE | NUMBER OF ASSIGNED VOICE USERS |
|---|---|
| Type#1 | X |
| Type#2 | Y |

| | |
|---|---|
| Type#n | Z |

FIG. 5

| Item | Output Rate | | |
|---|---|---|---|
| | 1Mbps | 1.92Mbps | 3.84Mbps |
| 1x Voice Mean Delay | 10.85 ms | 9.9 ms | 9.5 ms |
| 1x Voice Peak delay | 22.34 ms | 20.4 ms | 19.6 ms |
| 1x Voice Throughput | 100% | 100% | 100% |
| 1x Data Mean Delay | 7.2 ms | 58.8 ms | CONTINUOUSLY INCREASING |
| 1x Data Peak Delay | 21.7 ms | 251.8 ms | CONTINUOUSLY INCREASING |
| 1x Data Throughput | 100% | 100% | 72% |
| Do Data Mean Delay | 3.8 ms | 57.5 ms | CONTINUOUSLY INCREASING |
| Do Data Peak Delay | 24.2 ms | 252.8 ms | CONTINUOUSLY INCREASING |
| Do Data Throughput | 100% | 100% | 71% |
| Available Bandwidth | 0.6 Mbps | 0.6 Mbps | 0.6 Mbps |
| Voice Q Mean Size | 0.3 cell | 0.4 cell | 0.57 cell |
| Voice Q Peak Size | 1 cell | 1 cell | 1 cell |
| Data Q Mean Size | 23 cell | 308 cell | CONTINUOUSLY INCREASING |
| Data Q Peak Size | 162 cell | 1382 cell | CONTINUOUSLY INCREASING |

FIG. 15

APPARATUS AND METHOD FOR VOICE MULTIPLEXING IN AN ASYNCHRONOUS TRANSFER MODE NETWORK SUPPORTING VOICE AND DATA SERVICE

PRIORITY

This application claims priority to an application entitled "Apparatus and Method for Voice Multiplexing in Asynchronous Transfer Mode Network Supporting Voice and Data Service" filed in the Korean Industrial Property Office on Nov. 28, 2001 and assigned Serial No. 2001-74705, the contents of which are hereby incorporated by reference.

BACKGROUND OF THE INVENTION

1. Field of the Invention

The present invention relates generally to an ATM (Asynchronous Transfer Mode) network, and in particular, to an apparatus and method for multiplexing voice packets, efficiently using bandwidths of communication links connected to an IMA (Inverse MUX Assembly). More particularly, the present invention pertains to a technique of controlling an output rate of ATM cells delivered from an AAL2 (ATM Adaptation Layer 2) switch to an IMA in an ATM network using the IMA where voice, low-rate data, and high-rate data coexist.

2. Description of the Related Art

In a conventional ATM network, logical connections are established in correspondence with physical connections between a source and a destination. A data unit of a predetermined size (53 bytes) and format is delivered over the logical connections. The data unit is called an ATM cell. An ATM system can be connected to another ATM system using trunks like E1. In an ATM network supporting high-rate data service, trunks are multiplexed using an IMA to deliver a large amount of data.

FIG. 1 is a block diagram illustrating a conventional ATM communication network using IMAs. Referring to FIG. 1, a transmitter 10 and a receiver 20 are connected via TMAs. The transmitter 10 includes voice sources 101, an AAL2 switch 102 connected to the voice sources 101, low-rate data sources 103, an AAL5 framer 104 connected to the low-rate data sources 103, high-rate data sources 105, an AAL5 framer 106 connected to the high-rate data sources 105, and an ATM switch 107 with an IMA, that is, connected to the IMA, which is included into the switch. Thus, each switch has an IMA module, and the connection between switches is accomplished via the connection between IMA modules that are included in switches. The receiver 20 includes an ATM switch 108 with an IMA, an AAL2 switch 109 connected to the ATM switch 108, voice destinations 110 connected to the AAL2 switch 109, AAL5 deframers 111 and 113 connected to the ATM switch 108, and low-rate and high-rate data destinations 112 and 114 connected to the AAL5 deframers 111 and 113, respectively. AAL2 creates an ATM cell out of small-size voice packets, and AAL5 segments a long data stream into ATM cells.

In operation, the ALL2 switch 102 multiplexes short voice packets of a variable length into an ATM cell of a fixed size in order to suppress internal fragment caused by small traffic transmission in view of the use of the fixed cell. Internal fragment is a phenomenon that leads to performance degradation when small traffic is delivered in a fixed-size frame, not filling the entire frame, and thus utilizing part of a transmission link. The AAL5 framers 104 and 105 convert long data packets of a variable length into ATM cells of the fixed size.

The ATM switch 107 receives ATM cell streams from the AAL2 switch 102 and the ALL5 framers 104 and 105, and distributes multiplexed ATM cells of the ATM cell streams to a plurality of multiplexed physical links using the IMA. The physical links include a T1 transmission line (1.544 Mbps), an E1 transmission line (2.048 Mbps), a D3 transmission line (34 Mbps), and an STM (Synchronous Transfer Mode) transmission line. The following description is made in the context of the E1 transmission line, by way of example.

The receiving ATM switch 108 delivers the ATM cells received through the physical links to corresponding destinations. The AAL2 switch 109 recovers voice packets from an ATM cell received from the ATM switch 108 and delivers them to the voice destinations 110. Similarly, the AAL5 deframers 111 and 113 recover data packets from ATM cells received from the ATM switch 108 and deliver them to corresponding low-rate and high-rate data destinations 112 and 114.

FIG. 2 is a detailed block diagram of the AAL2 switch 102 and the ATM switch 107 illustrated in FIG. 1. Referring to FIG. 2, the AAL2 switch 102 includes an AAL2 multiplexer (MUX) unit 201 and an AAL2 demultiplexer (DEMUX) unit 202. The ATM switch 107 includes a MUX unit 203 and a DEMUX unit 204. The AAL2 MUX unit 201 has an input queue 301 for storing voice packets received from voice sources, and a MUX 302 for creating ATM cells out of the voice packets, as illustrated in FIG. 3.

In general, the AAL2 MUX unit 201 forms an ATM cell out of voice packets according to the rate of an output link or output port of a main board. If the output port has a high rate, the AAL2 MUX unit 201 processes the voice packets at high speed, and if the output port has a low rate, it processes the voice packets at low speed.

The reason for using AAL2 in the ATM network is to minimize internal fragment of a fixed-size ATM cell by forming the ATM cell out of a plurality of short packets through multiplexing. However, when a high-rate output port is used and an ATM cell is created at the rate of the output port, as soon as voice packets arrive at the input queue 301 of the AAL2 MUX unit 201, they are formed into ATM cells and then delivered to the high-rate output port. Each of the voice packets is eventually transmitted in one ATM cell.

In this case, AAL2 multiplexing offers no benefits and bandwidth waste results. Particularly, when the bandwidth of a communication line through an IMA is maximized, the bandwidth loss becomes severe. Multiplexing received voice packets after a predetermined time delay can solve this problem. However, this method is also based on a fixed output rate and thus an unnecessary time delay is produced when there are a small number of voice users.

SUMMARY OF THE INVENTION

It is, therefore, an object of the present invention to provide an apparatus and method for efficiently using bandwidths of communication links by controlling an output rate of a voice MUX in an ATM system using an IMA.

It is another object of the present invention to provide an apparatus and method for transmitting voice packets, efficiently using bandwidths of communication links over an ATM network supporting voice and data service.

To achieve the above and other objects, according to one aspect of the present invention, in an apparatus for multiplexing voice packets to an ATM cell in an ATM network supporting voice and data service, a queue stores voice packets from voice users to which voice calls have been connected, a MUX forms an ATM cell from voice packets received from the queue by multiplexing, and an output rate controller determines an output rate of the ATM cell according to information about the voice calls and controls the MUX according to the ATM cell output rate.

According to another aspect of the present invention, in a method of multiplexing voice packets to an ATM cell in an ATM network supporting voice and data service, voice packets received from voice users to which voice calls have been connected are stored. An output rate of ATM cells is determined according to information about the voice calls and an ATM cell transmission request is generated according to the ATM cell output rate. Upon receipt of the ATM cell transmission request, an ATM cell is formed from stored voice packets by multiplexing.

BRIEF DESCRIPTION OF THE DRAWINGS

The above and other objects, features, and advantages of the present invention will become more apparent from the following detailed description when taken in conjunction with the accompanying drawings in which:

FIG. 5 illustrates subscriber information managed in an output rate controller of the AAL2 switch according to the embodiment of the present invention;

FIG. 15 is a chart illustrating performance according to a rate between an AAL2 switchboard and the IMA.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method of controlling an output rate of an AAL2 switch based on a number of users for voice calls that have been established in an ATM system using an IMA.

Particularly, a description will be made of an ATM network over which a BTS (Base Transceiver Sub-system) that connects an MS (Mobile Station) to a radio channel, a BSC (Base Station Controller) that processes a call for the MS, and an MSC (Mobile Switching Center) are connected to one another in a mobile communication system. If the mobile communication system simultaneously supports voice service, low-rate data service, and high-rate data service, the ATM network uses an IMA for multiplexing a plurality of trunks in order to secure a sufficient bandwidth to transmit high-rate data.

As is known in the art, an ATM network creates ATM cells with voice or data packets. Voice packets are formed into an ATM cell immediately after they are generated in a mobile communication system using wideband communication links because voice service always has priority over data service due to its sensitivity to delay. In fact, a communication link having a wide bandwidth is not likely to be busy. However, voice packets are relatively short and nulls resulting from delivery of one voice packet in an ATM cell waste the bandwidth of the communication link. In the worst case, a voice packet occupies 2 bytes during a silent period and despite addition of a 10-byte AAL2 header, 41 bytes (=53−12) are unused in each ATM cell.

To prevent the bandwidth waste as much as possible, the maximum number of transmittable packets for a predetermined time period is determined according to the number of users to which voice calls have been connected, and excess voice packets are retained. For this purpose, an AAL2 switch for creating an ATM cell from voice packets must be configured and operated correspondingly, which will be described below. In addition, a description will be made of how the AAL2 switch collects required information and uses it to implement the present invention.

Figure 4:
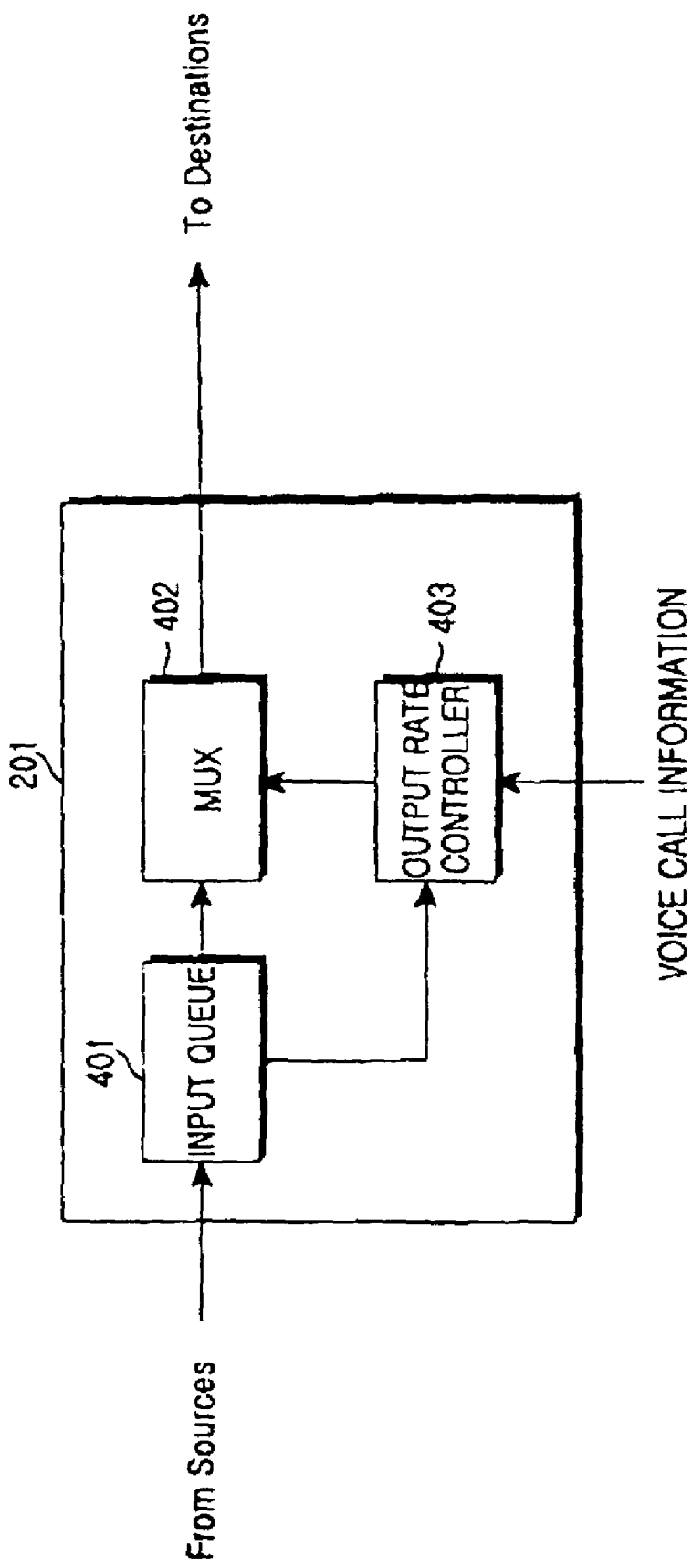
FIG. 4 is a detailed block diagram of an AAL2 MUX unit in an AAL2 switch according to an embodiment of the present invention.

FIG. 4 is a block diagram of the AAL2 MUX unit 201 of the AAL2 switch 102 in an ATM system using an IMA according to an embodiment of the present invention. Referring to FIG. 4, the AAL2 MUX unit 201 includes an input queue 401 for storing voice packets received from voice sources, a MUX 402 for multiplexing the voice packets into ATM cells, and an output rate controller 403 for controlling the rate of ATM cells output from the MUX 402. That is, the output rate controller 403 is further included to control the MUX 402 according to the present invention.

In the mobile communication system, each time a user is connected to a voice call, a vocoder is assigned for the voice call. When the user speaks, the vocoder generates voice packets of a predetermined size by compressing the voice. The voice packets are then transmitted over the ATM network. In this case, the vocoder serves as a voice source. Thus the input queue 401 stores voice packets received from a vocoder assigned to a voice call and the MUX 402 forms an ATM cell out of at least one voice packet stored in the input queue 401 under the control of the output rate controller 403.

The output rate controller 403 manages information about users for which voice calls have been established in a database. The voice user information includes information about the number of voice users assigned to each vocoder type, as illustrated in FIG. 5. That is, the output rate controller 403 manages the database illustrated in FIG. 5 and controls the output rate of ATM cells according to "Vocoder Type" and "Number of Assigned Voice Users".

Vocoder Type indicates a voice compression technique such as 8-kbps or 13-kbps EVRC (Enhanced Variable Rate Code) or Q-CELP (Qualcomm-Code Excited Linear Prediction). Thus, the data rate of voice packets generated from a user can be determined based on the type of a vocoder used. The number of voice users for each vocoder type is used to estimate the entire amount of traffic input to the MUX 402. If two users are connected to voice calls at 8 kbps and three users, at 13 kbps, the rate of voice traffic is 55 kbps (=8×2+13×3).

Figure 6:
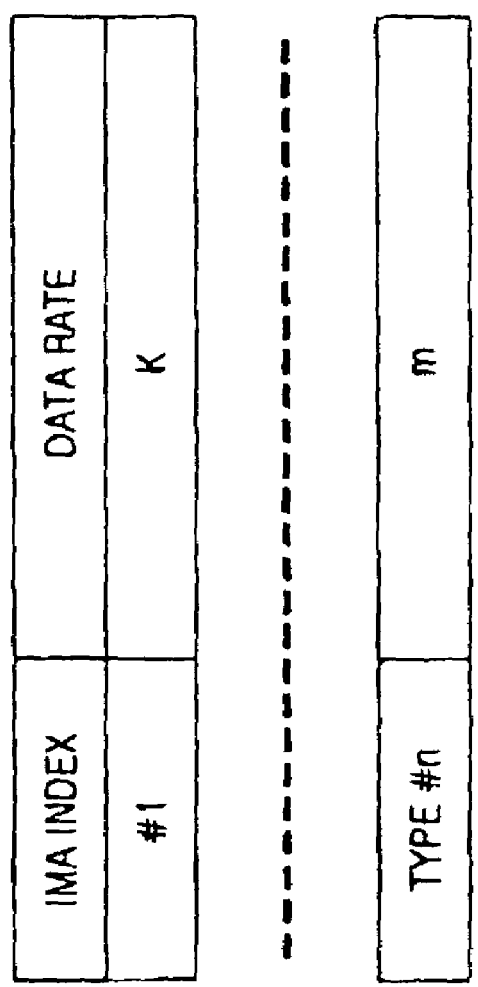
FIG. 6 illustrates IMA output link information managed in the output rate controller of the AAL2 switch according to the embodiment of the present invention.

As illustrated in FIG. 6, the output rate controller 403 also manages the rate of ATM cells according to the number of output links provided by the IMA connected to the AAL2 switch 102. Thus, the highest available output rate of the MUX 402 can be known.

Figure 2:
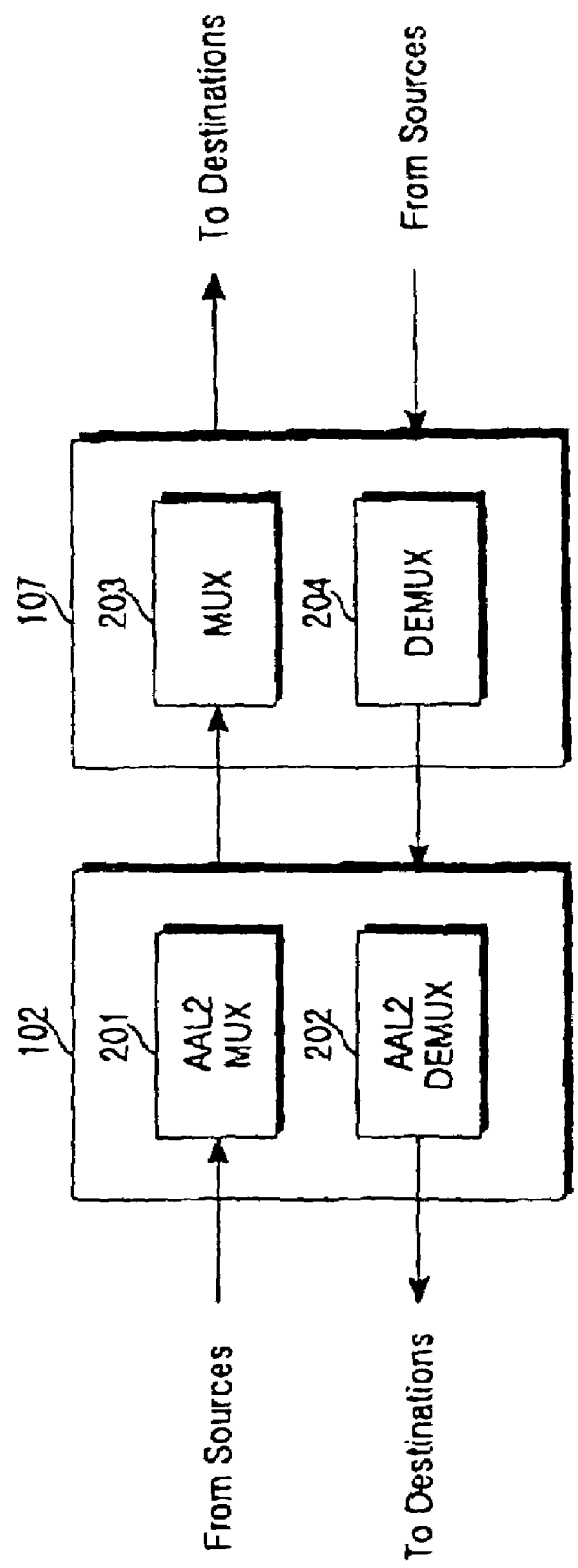
FIG. 2 is a detailed block diagram of an AAL2 switch and an ATM switch with an IMA illustrated in FIG. 1.
Figure 3:
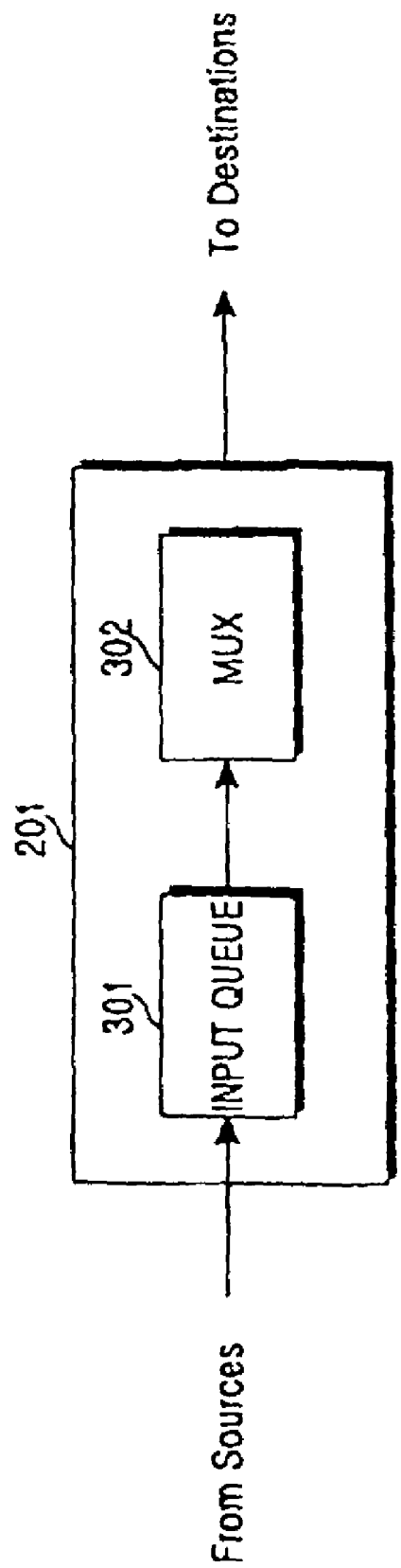
FIG. 3 is a detailed block diagram of an AAL2 MUX unit illustrated in FIG. 2.
Figure 7:
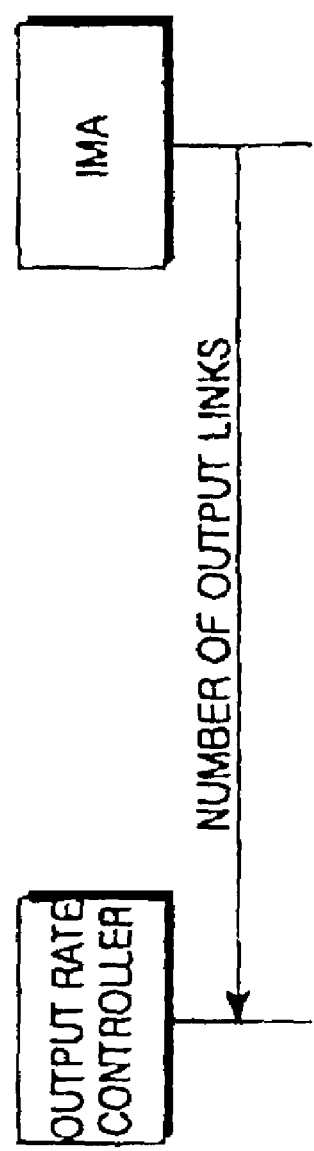
FIG. 7 illustrates an operation for delivering output link information from an IMA to the output rate controller according to the embodiment of the present invention.

FIG. 7 is a flowchart illustrating an operation for delivering information about the number of output links connected to the IMA from the IMA to the output rate controller 403 according to the embodiment of the present invention. Referring to FIG. 7, the IMA MUX unit 203 of FIG. 2 indicates to the output rate controller 403 the number of its output links when the ATM system is initially operated, or the number of the output links is changed.

Figure 8:
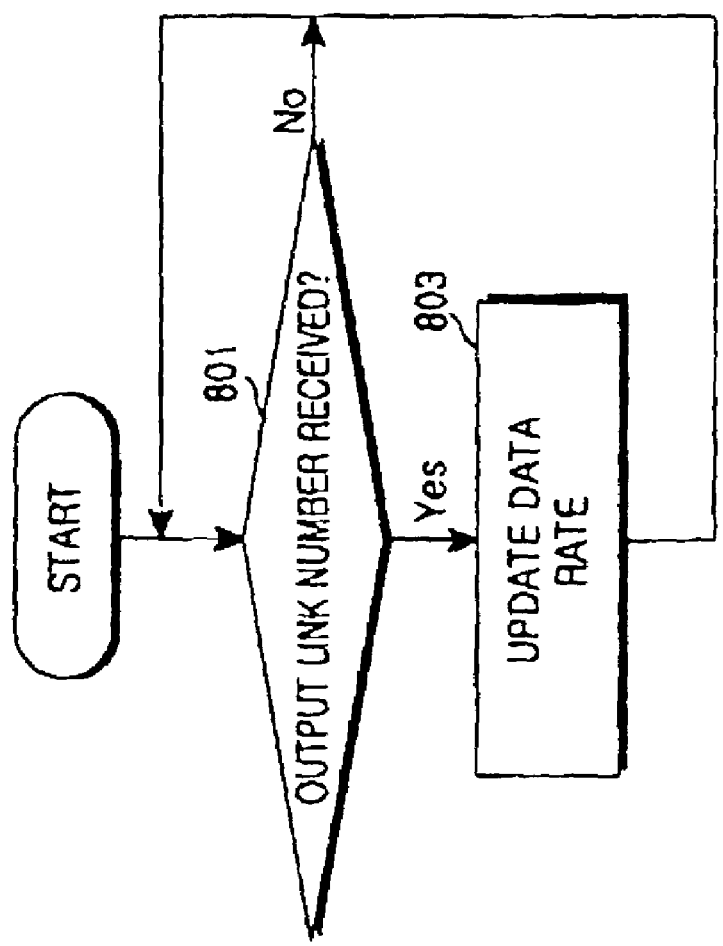
FIG. 8 is a flowchart illustrating an operation in the output rate controller for receiving output link information from the IMA and processing it according to the embodiment of the present invention.

FIG. 8 is a flowchart illustrating an operation in the output rate controller for receiving the output link information from the IMA and processing it according to the embodiment of the present invention. Referring to FIG. 8, the output rate controller 403 determines whether the output link information has been received from the IMA in step 801. The output link information indicates the number of output links connected to the IMA. Upon receipt of the output link information, the output rate controller 403 updates a data rate corresponding to a corresponding IMA index in its database illustrated in FIG. 6 in step 803.

While the output rate controller 403 collects output link information in the procedures illustrated in FIGS. 7 and 8, it controls the rate of ATM cells according to the rate of input links rather than that of output links in actual implementation. Therefore, the output rate controller 403 collects information about established voice calls from a call processor in a BTS or a BSC. The call processor provides voice call information to the output rate controller 403 each time a new voice call is connected, or an existing voice call is released. The voice call information includes information about a vocoder type assigned to a voice call.

Figure 9:
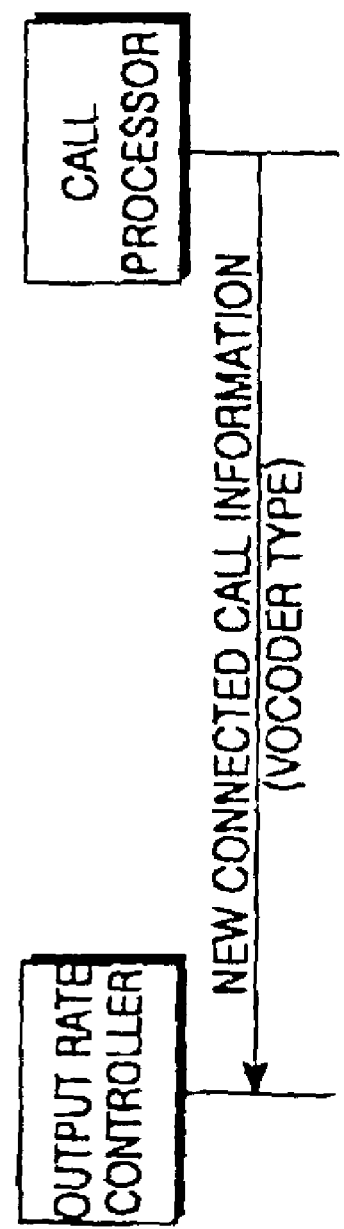
FIG. 9 illustrates an operation for delivering information about a new connected voice call from a call processor to the output rate controller according to the embodiment of the present invention.

FIG. 9 illustrates an operation for delivering information about a new established voice call from the call processor to the output rate controller 403 according to the embodiment of the present invention. Referring to FIG. 9, when a new voice call is established, the call processor transmits to the output rate controller 403 information about the new voice call. The new voice call information includes information about a vocoder type assigned to the call. Then the output rate controller 403 updates the number of users assigned to the vocoder type in its database illustrated in FIG. 5.

Figure 10:
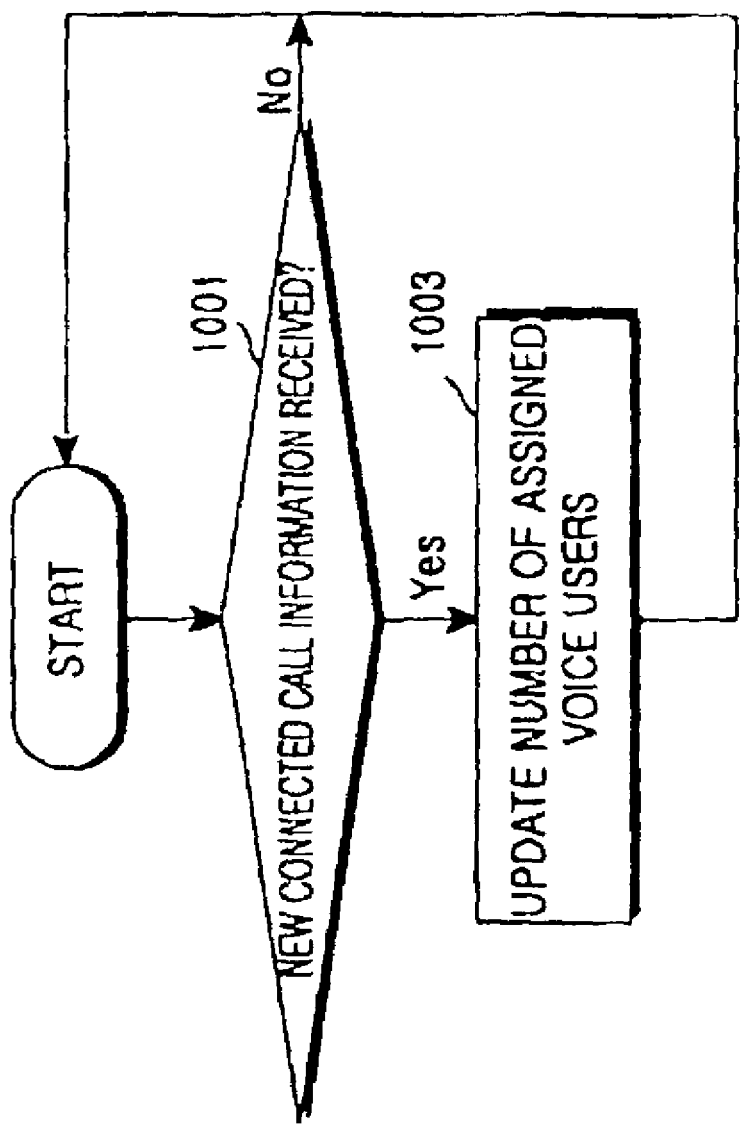
FIG. 10 is a flowchart illustrating an operation in the output rate controller for processing new voice call information received from the call processor according to the embodiment of the present invention.

FIG. 10 is a flowchart illustrating an operation in the output rate controller 403 for processing new voice call information received from the call processor according to the embodiment of the present invention. Referring to FIG. 10, the output rate controller 403 determines whether new voice call information has been received from the call processor in step 1001. Upon receipt of the new voice call information, the output rate controller 403 increases the number of voice users for a vocoder type assigned to the new established call by 1 in its database illustrated in FIG. 5 in step 1003. For example, if the new voice call uses 8-kbps EVRC, the number of voice users corresponding to 8-kbps EVRC is increased. Then, the output rate controller 403 can estimate the amount of traffic input to the AAL2 MUX unit 201 according to the vocoder type and the number of voice users assigned to the vocoder type.

Figure 11:
FIG. 11 illustrates an operation for delivering information about a released voice call from the call processor to the output rate controller according to the embodiment of the present invention.

FIG. 11 illustrates an operation for delivering information about a released voice call from the call processor to the output rate controller 403 according to the embodiment of the present invention. Referring to FIG. 11, the call processor transmits to the output rate controller 403 information about a released voice call. The released voice call information includes information about a vocoder type assigned to the released voice call. The output rate controller 403 then updates the number of voice users assigned to the vocoder type in its database illustrated in FIG. 5.

Figure 12:
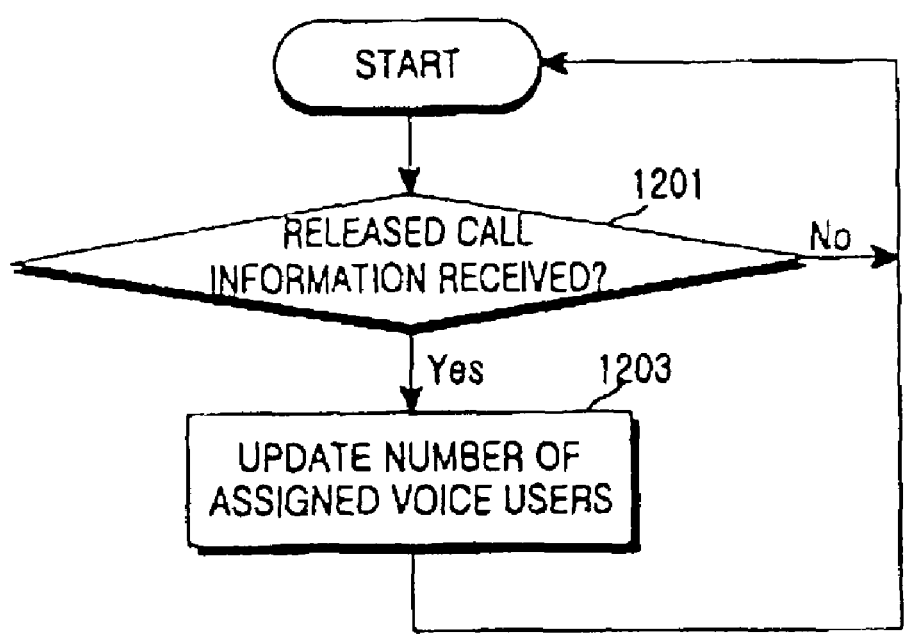
FIG. 12 is a flowchart illustrating an operation in the output rate controller for processing released voice call information received from the call processor according to the embodiment of the present invention.

FIG. 12 is a flowchart illustrating an operation in the output rate controller 403 for receiving released voice call information from the call processor and processing it according to the embodiment of the present invention. Referring to FIG. 12, the output rate controller 403 determines whether released voice call information has been received from the call processor in step 1201. Upon receipt of the released call information, the output rate controller 403 decreases the number of voice users assigned to a vocoder type for the released call by 1 in step 1203.

The output rate controller 403 manages the databases illustrated in FIGS. 5 and 6 according to voice user information and output link information acquired in the procedures illustrated in FIGS. 7 to 12, and controls the rate of ATM cells output from the MUX 402 accordingly.

To control the ATM cell rate, the output rate controller 403 operates based on the concept of coin. The output rate controller 403 calculates a coin value (i.e., a given coin) available for a predetermined time period (i.e., coin interval) according to the collected voice user information and counts the number of ATM cells to be output. If the number of ATM cells exceeds the given coin, the output rate controller 403 discontinues the output of the ATM cells. Thus it can be said that the output rate controller 403 controls an ATM cell rate according to the rate of input voice traffic rather than an available rate of output links.

The given coin is determined by $$\text{Given Coin} = \frac{\text{Output Rate}}{\text{Coin Interval} \times \text{ATM Cell SIze}} \qquad (1)$$

$$\text{Output Rate} =$$

$$\alpha + \text{Input Rate} = \alpha + \sum (\text{Vocoder Rate} \times \text{Voice User Number})$$

wherein Coin Interval denotes a control period in which the output rate controller 403 controls the output of ATM cells. The MUX 402 outputs ATM cells within the given coin during the coin interval under the control of the output rate controller 403. That is, the given coin is defined as the maximum number of ATM cells that can be output during the coin interval.

Output Rate in Eq. (1) is the output rate of ATM cells from the MUX 402. It is preferable to set the output rate to be equal to the input rate of the MUX 402 or greater than the input rate by a predetermined value α. The input rate is the rate of generating voice packets calculated according to the number of voice users with voice calls connected and vocoder rates (e.g., 8 or 13 kbps) assigned to the voice calls.

If the output rate is equal to the input rate, problems may be generated when voice traffic is concentrated at a particular time. To alleviate the voice traffic concentration, a system manager assigns a predetermined extra bandwidth to the voice service by setting α. α is set to such a value that the output rate does not exceed the data rate of the IMA.

Figure 13:
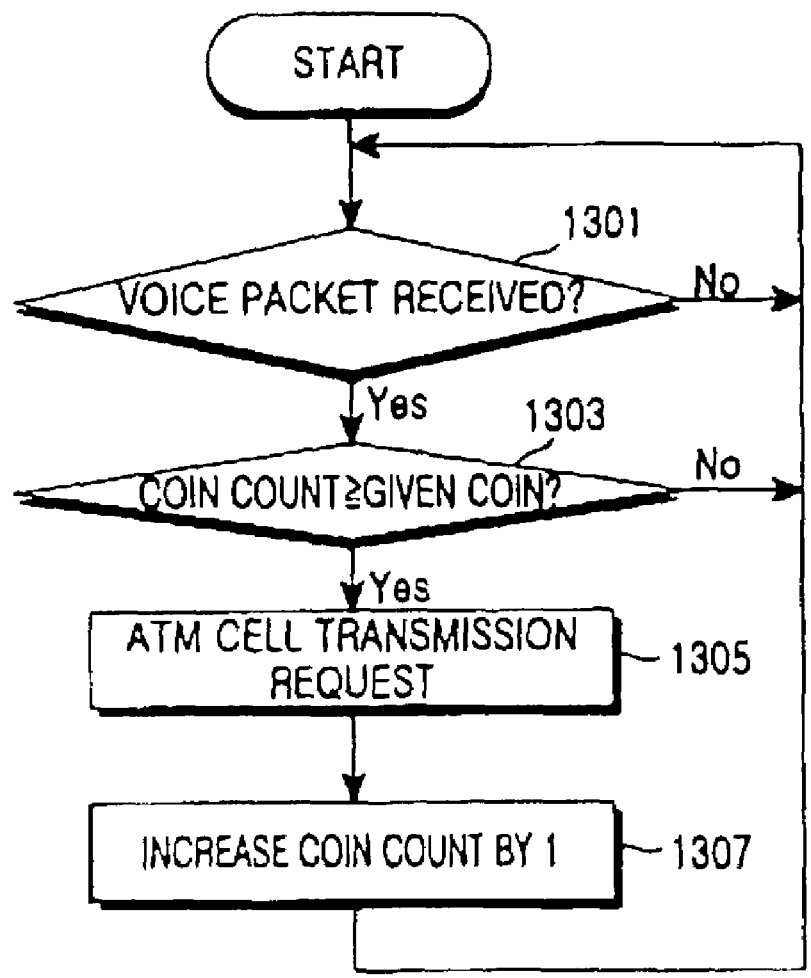
FIG. 13 is a flowchart illustrating an operation in the output rate controller for controlling the output rate of ATM cells according to the embodiment of the present invention.

FIG. 13 is a flowchart illustrating an operation in the output rate controller 403 for controlling the rate of ATM cells output from the MUX 402 according to the embodiment of the present invention. The output rate controller 403 predetermines a given coin according to the number of voice users and updates it by Eq. (1) each time voice call information is received due to set-up of a new voice call or a release of an existing voice call.

Referring to FIG. 13, the output rate controller 403 determines whether voice packets have been received at the input queue 401 in step 1301. Upon receipt of the voice packets, the output rate controller 403 compares a current coin count with the given coin in step 1303. The given coin is the number of transmittable ATM cells during a coin interval and the coin count is the number of transmitted ATM cells. Calculation of the given coin and the coin count will be described later with reference to FIG. 14.

If the coin count is less than the given coin, the output rate controller 403 requests the MUX 402 to output an ATM cell in step 1305. If the coin count is equal to or greater than the given coin, the output rate controller 403 returns to step 1301. In step 1307, the output rate controller 403 increases the coin count by 1.

Upon request for outputting an ATM cell from the output rate controller 403, the MUX 402 creates an ATM cell out of at least one voice packet read from the input queue 401. If there are no voice packets in the input queue 401, the MUX 402 does not create an ATM cell. If the input queue 401 has more voice packets than can be formed to an ATM cell, the MUX 402 reads voice packets in the order of storage and forms one ATM cell from them. The remaining voice packets are retained until the next ATM cell transmission request is received. The ATM cell is transmitted to the receiver through the ATM switch 107 illustrated in FIG. 1.

While the output rate controller 403 controls the ATM cell output rate in the procedure of FIG. 13 each time a voice packet is received at the input queue 401 of the AAL2 switch 102, it may control the ATM cell output rate in every predetermined operation period. The operation period is equal to the coin interval or set to a time period required for receiving voice packets with which to create an ATM cell according to the number of voice users. In the latter case, the operation period is calculated by $$\text{Operation Period} = \frac{\text{ATM Cell Size}}{\text{Output Rate}} \quad (2)$$

Figure 14:
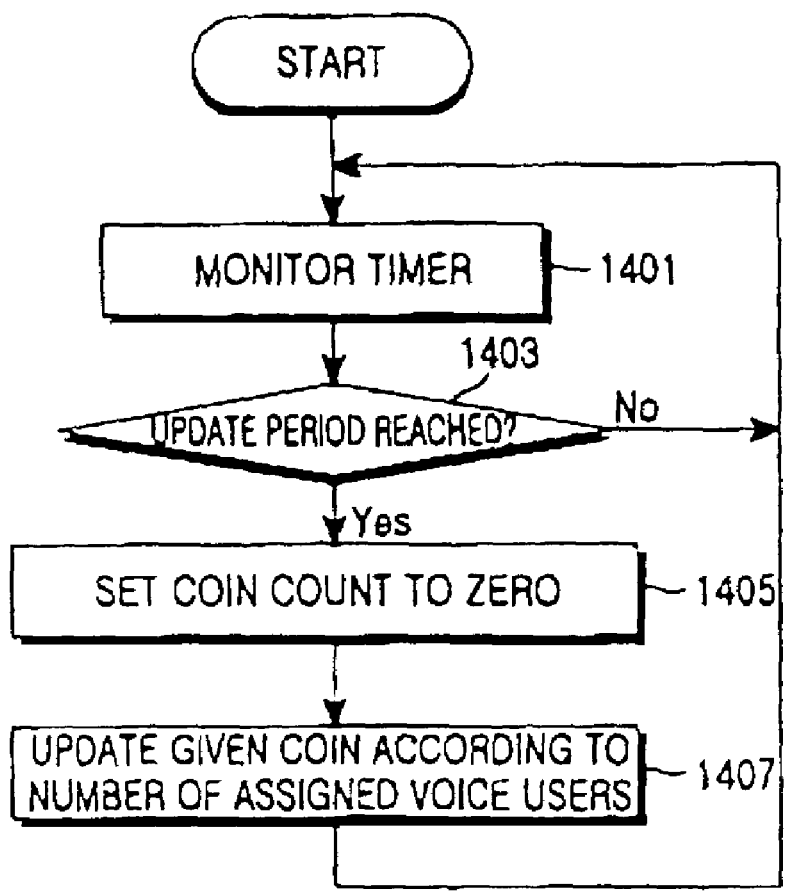
FIG. 14 is a flowchart illustrating an operation in the output rate controller for updating parameters for output rate control according to the embodiment of the present invention.

FIG. 14 is a flowchart illustrating an operation in the output rate controller 403 for setting parameters related to output rate control in every predetermined update period according to the embodiment of the present invention. The parameters are a coin count and a given coin. They are updated at every coin interval, for example.

Referring to FIG. 14, the output rate controller 403 monitors a timer set to a predetermined coin interval in step 1401 and determines whether the coin interval has expired in step 1403. If it has, the output rate controller 403 sets a coin count to 0 in step 1405. In step 1407, the output rate controller 403 calculates the output rate of ATM cells according to the number of voice users stored in its database and sets a given coin based on the output rate. Finally, the output rate controller returns to step 1401.

Instead of calculating the given coin in the control period of resetting the coin count, the given coin can be updated in a different period in an another embodiment of the present invention. In this case, the given coin is updated when voice call information is received from the call processor. That is, each time voice call information about a new connected voice call or a released voice call is received in the procedures illustrated in FIGS. 10 and 12, the output rate controller 403 updates the number of voice users in its database and calculates a given coin by Eq. (1).

Referring to FIGS. 13 and 14 again, the output rate controller 403 resets the coin count in every predetermined period and updates the given coin according to the number of voice users. After the procedure of FIG. 13 using the coin count and given coin, ATM cells are output. Each time one ATM cells is output, the coin count is increased by 1 and if the coin count is equal to the given coin, ATM cell transmission is discontinued.

That is, the output rate controller 403 controls the output rate of ATM cells from the MUX 402 according to a predetermined number of ATM cells per unit time. When an update period is reached during controlling the ATM cell output rate, the output rate controller 403 updates the coin count and the given coin and then repeats the procedure illustrated in FIG. 13.

Figure 1:
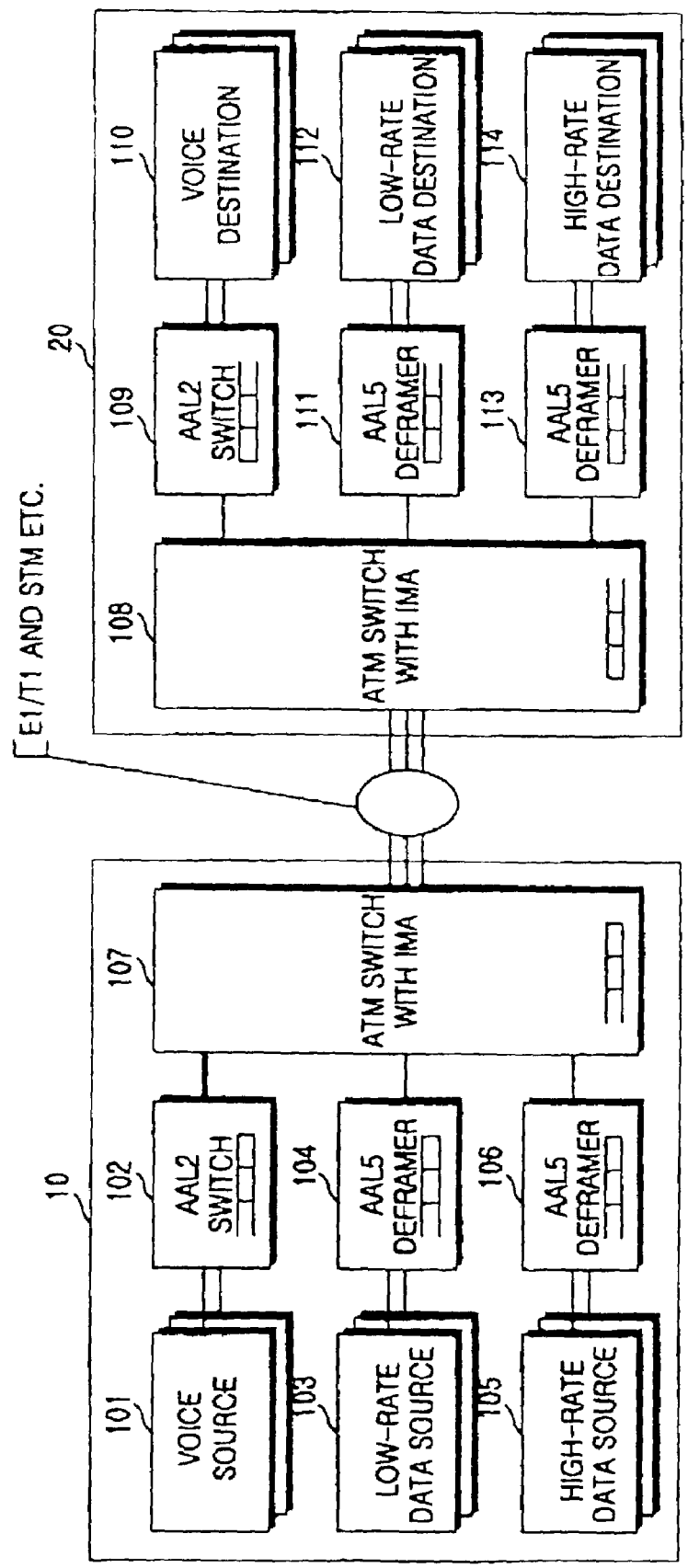
FIG. 1 is a block diagram illustrating a conventional ATM communication network using IMAs.

To verify the effectiveness of the present invention, a simulation was performed on a mobile communication system as illustrated in FIG. 1 under the conditions of CDMA (Code Division Multiple Access) 2000 1× voice service, AAL2 switching, and an 8-kbps QCELP vocoder. Here, considering internal control information and AAL2 headers, an average data rate per subscriber is 6.7 kbps. Taking CDMA2000 1× data service as low-rate data service, its average data rate per sector is assumed to be 100 kbps. Taking CDMA2000 1× EV-DO (Evolution-Data Only) data service as high-rate data service, its average data rate per sector is assumed to be 600 kbps.

In an IMA, an ATM cell for the voice service has priority over that for the data service. The IMA is connected to two E1 links and thus its output rate is 3.84 Mbps (=1.92 Mbps×2).

When the IMA is assigned to 105 voice users, three sectors of low-rate data service with an average rate of 300 kbps and three sectors of high-rate data service with an average rate of 1.8 Mbps, performance according to a rate between an AAL2 switchboard and the IMA is illustrated in FIG. 15.

Referring to FIG. 15, Mean Delay is the average delay of packets, Peak Delay is the longest delay of the packets, and Throughput is a ratio of successfully received packets to generated packets. Available Bandwidth is the arithmetically calculated unused bandwidth of the output links connected to the IMA. Q Size is the size of a queue for buffering data or voice ATM cells.

When a rate between the IMA and the AAL2 MUX is not controlled, the data rate is 3.84 kbps. In this case, the output rate of the AAL2 MUX is equal to that of the IMA. As soon as voice packets arrive, they are formed to ATM cells. Consequently, internal fragment becomes severe, resulting in a bandwidth waste. Therefore, the bandwidth of a data service becomes narrow, increasing a data service delay and decreasing throughput.

1 Mbps and 1.92 Mbps are achieved when the present invention is applied. The former corresponds to when $\alpha$ in Eq. (1) is set to a relatively small value, e.g., 300 kbps, and the latter, to when $\alpha$ is set to a relatively great value, e.g., 1 Mbps. In both cases, a data service delay is stable and throughput reaches 100%.

In accordance with the present invention as described above, the rate between an AAL2 MUX and an IMA is controlled in an ATM system. When an AAL2 voice frame arrives at the AAL2 MUX, retained voice frames and the new voice frame are multiplexed to an ATM cell. The resulting maximization of a multiplexing gain and minimization of internal fragment leads to maximum utilization of the bandwidth of links connected to the IMA. Besides voice service, therefore, data service is provided effectively through the IMA.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for multiplexing voice packets to an ATM (Asynchronous Transfer Mode) cell in an ATM network supporting voice and data service, the apparatus comprising:
   a queue for storing voice packets from voice users to which voice calls have been connected;
   a multiplexer (MUX) for forming an ATM cell from the voice packets received from the queue; and
   an output rate controller for determining an output rate of the ATM cell according to information about connected voice calls by calculating a coin value and controlling the MUX according to the ATM cell output rate.

2. The apparatus of claim 1, wherein the voice call information indicates a number of the voice users and vocoder rates assigned to the voice users.

3. The apparatus of claim 2, wherein the output rate controller calculates a maximum number of ATM cells that can be output during a predetermined control period according to the number of the voice users and the vocoder rates, and controls the MUX according to the maximum number of ATM cells.

4. The apparatus of claim 3, wherein the maximum number of ATM cells is calculated by $$N_{max} = \frac{\text{Output Rate}}{\text{Coin Interval} \times \text{ATM Cell SIze}}$$

Output Rate =

$$\alpha + \text{Input Rate} = \alpha + \sum (\text{Vocoder Rate} \times \text{Voice User Number})$$

wherein $N_{max}$ is the maximum number of ATM cells that can be output during the control period, Coin Interval is the control period, $\alpha$ is a margin set by a system manager, Vocoder Rate is a vocoder rate to each of the voice users, and Voice User Number is the number of the voice users.

5. The apparatus of claim 3, wherein when a voice packet is received at the queue, the output rate controller compares a number of ATM cells transmitted during the control period with the maximum number of ATM cells and, if the number of transmitted ATM cells is less than the maximum number of ATM cells, requests the MUX to output one ATM cell.

6. The apparatus of claim 3, wherein in every predetermined operation period, the output rate controller compares a number of ATM cells transmitted during the control period with the maximum number of ATM cells and, if the number of transmitted ATM cells is less than the maximum number of ATM cells, requests the MUX to output one ATM cell.

7. The apparatus of claim 6, wherein the operation period is calculated by $$\text{Operation Period} = \frac{\text{ATM Cell Size}}{\text{Output Rate}}$$

Output Rate =

$$\alpha + \text{Input Rate} = \alpha + \sum (\text{Vocoder Rate} \times \text{Voice User Number})$$

wherein $\alpha$ is a margin set by a system manager, Vocoder Rate is a vocoder rate to each of the voice users, and Voice User Number is the number of the voice users.

8. A method of multiplexing voice packets to an ATM (Asynchronous Transfer Mode) cell in an ATM network supporting voice and data service, the method comprising the steps of:
   (1) storing in a queue voice packets from voice users to which voice calls have been connected;
   (2) determining an output rate of ATM cells according to information about connected voice calls by calculating a coin value and generating an ATM cell transmission request according to the ATM cell output rate; and
   (3) forming an ATM cell from the stored voice packets by multiplexing upon receipt of the ATM cell transmission request.

9. The method of claim 8, wherein the voice call information indicates a number of the voice users and vocoder rates assigned to the voice users.

10. The method of claim 9, wherein a maximum number of ATM cells that can be output during a predetermined control period is calculated according to the number of the voice users and the vocoder rates, and ATM cell transmission is controlled according to the maximum number of ATM cells in the step (2).

11. The method of claim 10, wherein the maximum number of ATM cells is calculated by $$N_{max} = \frac{\text{Output Rate}}{\text{Coin Interval} \times \text{ATM Cell SIze}}$$

Output Rate =

$$\alpha + \text{Input Rate} = \alpha + \sum (\text{Vocoder Rate} \times \text{Voice User Number})$$

wherein $N_{max}$ is the maximum number of ATM cells that can be output during the control period, Coin Interval is the control period, $\alpha$ is a margin set by a system manager, Vocoder Rate is a vocoder rate to each of the voice users, and Voice User Number is the number of the voice users.

12. The method of claim 10, wherein when a voice packet is received at the queue, a number of ATM cells transmitted during the control period is compared with the maximum number of ATM cells, and if the number of transmitted ATM cells is less than the maximum number of ATM cells, the ATM cell transmission request is generated in the step (2).

13. The method of claim 10, wherein in every predetermined operation period, a number of ATM cells transmitted during the control period is compared with the maximum number of ATM cells, and if the number of transmitted ATM cells is less than the maximum number of ATM cells, the ATM cell transmission request is generated in the step of (2).

14. The method of claim 13, wherein the operation period is calculated by $$\text{Operation Period} = \frac{\text{ATM Cell Size}}{\text{OutputRate}}$$

-continued $$\text{Output Rate} = \alpha + \text{Input Rate} = \alpha + \sum (\text{Vocoder Rate} \times \text{Voice User Number})$$

wherein $\alpha$ is a margin set by a system manager, Vocoder Rate is a vocoder rate to each of the voice users, and Voice User Number is the number of the voice users.

* * * * *

UNITED STATES PATENT AND TRADEMARK OFFICE
CERTIFICATE OF CORRECTION

PATENT NO.        : 7,583,675 B2                                                    Page 1 of 1
APPLICATION NO.   : 10/306547
DATED             : September 1, 2009
INVENTOR(S)       : Sung-Won Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1533 days.

Signed and Sealed this

Fourteenth Day of September, 2010

David J. Kappos
*Director of the United States Patent and Trademark Office*